United States Patent Office 3,193,764
Patented July 6, 1965

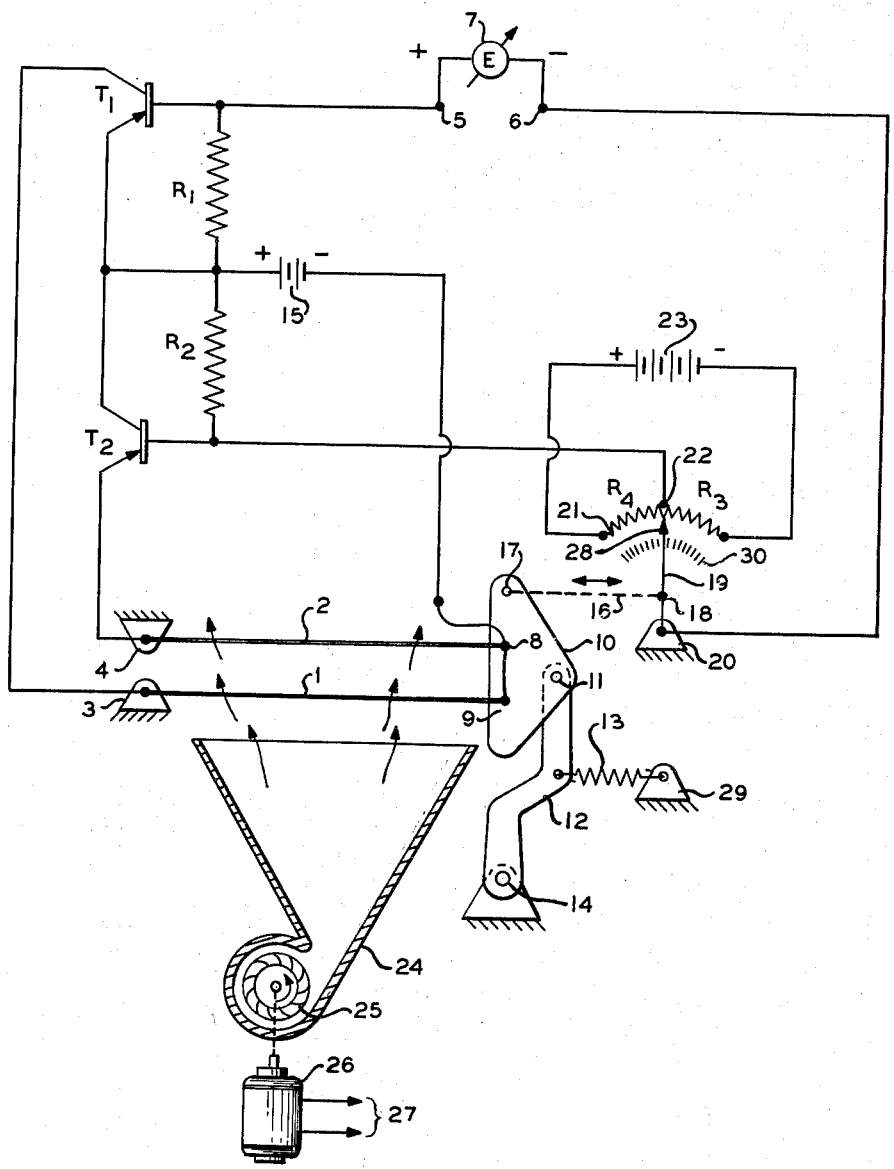

3,193,764
ELECTRICAL MEASURING DEVICE USING A DOUBLE ACTING THERMAL ACTUATOR
Nathaniel B. Wales, Jr., Sharon, Conn., and Charles B. Grady, Jr., West Orange, N.J., assignors to The Metrodynamics Corporation, a corporation of New Jersey
Filed Mar. 1, 1961, Ser. No. 92,698
2 Claims. (Cl. 324—106)

This invention relates to an improved positioning device using the thermal expansion of wires or the like as a transducer, and adapted for use in a fast acting high reliability electromechanical servo control system.

Prior to the present invention, designers have been reluctant to use thermal expansion as the positioning means in an actuator intended for rapid control response, in spite of the advantage of its simplicity, because, although it is possible very rapidly to convert electrical energy into heat so as to expand such a transducer, the mechanisms available to cool it (namely: forced convection, conduction, radiation, or thermoelectric refrigeration) cannot in general match the heating speed, so that at best a device having slow assymetrical response characteristics would result.

Our invention overcomes these limitations for a wide range of applications by providing a double acting system in which the heating of a first wire vectorially adds to the positioning displacement of a controlled member, while the heating of a second wire vectorially subtracts from the positioning displacement of this member for a specified degree of freedom. The term "wire" is here used broadly to denote any thermally responsive transducer, such as electrical heater elements, electrically heated bi-metallic strips or coils, or the like.

By thus providing two oppositely acting thermal actuators together with a mechanical adding means for their opposing actions, it becomes possible for a rapid control displacement to take place in either direction, by energizing the appropriate expander while the opposite expander is cooling and contracting. This results in a greatly improved symmetry and speed of control response for such devices.

Although the preferred form of our invention uses electrically heated wires as the differential actuators, the broad principle of our concept equally well embraces other means such as missile actuators in which exhaust gases are switched between differential expansion tubes.

An object of this invention is to provide a reliable, low-cost positioner for servomechanisms.

A second object is to provide a thermal positioner which has substantially symmetrical control-response characteristics.

A third object is to provide an electro-thermal positioner having improved frequency response.

A fourth object is to provide a servo system suitable for the synchronous control of magnetic tape positioners.

Other objects are implicit in the accompanying specifications and claims.

In the accompanying drawing,

The sole figure is the schematic diagram of one illustrative application of our invention to a null-seeking servo system for continuously registering on a pointer the value and polarity of a variable electrical input potential.

Such a device would also be useful to actuate a digital voltmeter display, or a pen-type recorder.

In the sole figure, wire 1 is maintained under tension between a fixed insulated terminal 3 and a moveable terminal 9 mechanically secured to lever 10, while wire 2 is similarly maintained under tension between a fixed insulated terminal 4 and a moveable terminal 8 mechanically secured to lever 10. Terminals 8 and 9 are electrically connected to one another, and thence flexibly connected to the negative terminal of battery 15.

Lever 10 is pivotally secured to lever 12 by stud 11 whose axis is normally midway between the lines of tension of wires 1 and 2. Lever 12 in turn is pivotally secured to the fixed pivot 14, and is urged toward clockwise movement about pivot 14 by spring 13 secured to fixed anchor lug 29. Spring 13 thus supplies the tension to both wires 1 and 2 through the lever 10 via terminal studs 9 and 8 respectively, which divide the applied force. Wires 1 and 2 are preferably made of an electrically resistive high temperature alloy such as "Nichrome" and are designed to operate at all times within their elastic limits.

It may be seen that when an electric current is passed through wire 1 alone, thereby heating and longitudinally (among other modes) expanding it, terminal 9 is allowed to move to the right with a consequent counterclockwise rotation of lever 10 about pivot 11, under the force and displacement of spring 13. Conversely, if wire 2 alone is energized, its expansion will allow terminal 8 to move to the right, resulting in a clockwise rotation of lever 10 about its pivot 11 under the force and displacement of spring 13.

Evidently, lever 10 is performing the function (for small angles) of an algebraic adder which simultaneously accumulates the oppositely directed displacements of wires 1 and 2. The resultant differential angular displacement of lever 10 is coupled to an output and feedback pointer 19 by the mechanical link 16 which is pivotally secured at one end to lever 10 by stud 17 and at the other end to pointer 19 by stud 18. Pointer 19 is pivoted to fixed terminal lug 20, and is provided with an indicating scale 30. A brush 28 at the outer end of pointer 19 generates a feedback voltage signal between terminals 20 and 22 by wiping along the equal potentiometer resistance windings $R_4$ and $R_3$ which are connected in series with the reference voltage supply 23.

The foregoing feedback signal voltage between potentiometer center tap 22 and pointer pivot 20 is compared with the unknown variable input voltage E (7) appearing across terminals 5 and 6 by the series nulling connection shown, and the difference, or error voltage, is applied across the series balancing resistors $R_1$ and $R_2$.

$T_1$ is a PNP power transistor which can supply variable heating current from battery 15 to wire 1 through its emitter and collector; while $T_2$ is a PNP power transistor which can supply variable heating current from battery 15 to wire 2 through its emitter and collector.

From the circuit diagram it may be seen that when no error signal exists there will be no current through $R_1$ or $R_2$, and both transistors $T_1$ and $T_2$ will be cut off, thereby leaving both wires 1 and 2 unenergized. If the input voltage 7 now increases so that terminal 5 is positive and 6 is negative, an error signal current will flow from $R_1$ to $R_2$ thereby further cutting off $T_1$, but causing $T_2$ to conduct by making its base more negative than its emitter. Wire 2, consequently, receives current from $T_2$ and heats up, thereby moving brush 28 clockwise along $R_3$ until enough negative potential is experienced to buck out the major part of the error signal, and, consequently, a null-seeking equilibrium is attained in which further heating of wire 1 would overcompensate the input signal.

In a converse manner, the reverse polarity of input voltage between terminals 5 and 6 will cause $T_1$ to conduct and $T_2$ to cut off thereby moving lever 10 and brush 28 counterclockwise to a position of balance. In this way $T_1$ and $T_2$ form a switching means to switch between the heating energization of wire 1 or wire 2 by battery 15, depending on the polarity of the control signal.

The design values are chosen so that a small percentage of the input voltage 7 to be measured will produce an error signal capable of modulating the full range of current control available from either $T_1$ or $T_2$. In this way, the equilibrium error voltage necessary to maintain either wire 1 or 2 at the expansion temperature of balance will introduce a negligible error due to the imperfect nulling required for this condition. In order to accelerate the thermal response cooling time of the system a blower wheel 25 driven by motor 26 via energizing leads 27, may be provided to supply a forced air stream through duct 24 which directs this air stream in a transverse blast across the transducer wires 1 and 2 to promote rapid cooling.

It is to be noted that the disclosed form of our invention is illustrative only and is not to be construed as a limitation on the scope of application of our novel principle. For instance, the disclosed system is a closed loop servo system, but it is equally possible to use our double acting thermal actuator in an open loop control system without feedback.

What we claim is:

1. In a device for indicating the value of a variable electrical signal potential, the combination comprising: a first thermally extensible resistance wire, a second thermally extensible resistance wire, a lever, tension means to move said lever in response to the difference between the thermal extensions of said first and second wires, a variable reference potential, means responsive to the position of said lever for varying said reference potential, comparator means to generate an error potential which is a function of the algebraic difference between said signal potential and said reference potential, switch means to apply a first variable current to said first wire in response to the magnitude of a first polarity of said error potential and to apply a second variable current to said second wire in response to the magnitude of a reversal of said first polarity, said switch means including a biasing circuit to prevent said application of said second current in response to said first polarity and to prevent said application of said first current in response to said reversal and indicator means actuated by said lever.

2. In a device as defined by claim 1, a blower aligned to pass a forced current of air in a substantially transverse direction relative to the major dimension of said wires.

References Cited in the file of this patent
UNITED STATES PATENTS

| | | |
|---|---|---|
| 496,312 | Hunter | Apr. 25, 1893 |
| 806,560 | Northrup | Dec. 5, 1905 |
| 926,536 | Babcock | June 29, 1909 |
| 1,784,922 | Allen | Dec. 16, 1930 |
| 2,809,350 | Smith | Oct. 8, 1957 |
| 2,836,366 | Eckberg | May 27, 1958 |
| 2,932,785 | Shovic | Apr. 12, 1960 |